Patented Apr. 26, 1949

2,468,599

UNITED STATES PATENT OFFICE 2,468,599

PROCESS OF PRODUCING FLAVANTHRONES

Hans Z. Lecher, Plainfield, and Mario Scalera and Warren S. Forster, Somerville, N. J., assignors to American Cyanamid Company, New York, N. Y., a corporation of Maine No Drawing. Application September 25, 1945, Serial No. 618,582

12 Claims. (Cl. 260—273)

This invention relates to an improved process of converting beta amino anthraquinones into flavanthrones.

Although the production of flavanthrone from beta amino anthraquinone is one of the oldest in anthraquinone chemistry, the process has shown little improvement over the original one invented by Bohn in 1901. The usual process involves the reaction of beta amino anthraquinone with antimony pentachloride in nitrobenzene at 200° C. This process presents a considerable health hazard and does not give good yields. Nevertheless it is still used today as other processes which have been proposed have been too expensive.

According to the present invention we have found that excellent yields of flavanthrones are obtained from beta amino anthraquinones by using the tetrachloride or tetrabromide of titanium as condensing agent. The reaction proceeds smoothly at temperatures of 100 to 175° C. When a liquid tetrahalide is used the process may be carried out without any diluent, but it is usually advantageous to dilute the reaction mixture with a suitable solvent, such as a chlorinated benzene.

The reaction produces the dyestuffs in a partially reduced form containing titanium. These complexes are insoluble in organic solvents and are readily recovered by filtration, which results automatically in the removal of impurities soluble in the organic solvents. From the addition compounds the flavanthrones are regenerated by hydrolysis in either acid or alkaline medium. It is an advantage of the present invention that the hydrolysis may be combined with a further purification by vatting the titanium complex after removing the organic solvent using sodium hydrosulfite and caustic alkali. The vat is then filtered, insoluble impurities being removed together with the titanium residue produced by the hydrolysis. The filtrate may then be aerated to produce the dyestuff which may be recovered in a purer state by filtration.

The process of the present invention may be used with beta amino anthraquinone itself but is equally applicable to substituted beta amino anthraquinones which contain the alpha position ortho to the amino group free. Typical of such substituted beta amino anthraquinones are halogen derivatives, such as 2-amino-3-bromo anthraquinone, 2-amino-6-chloro-anthraquinone; alkyl derivatives such as 2-amino-3-methyl anthraquinone; alkoxy derivatives; acylamino derivatives, and the like.

The invention will be illustrated in greater detail in the following specific examples, all parts being by weight.

*Example 1*

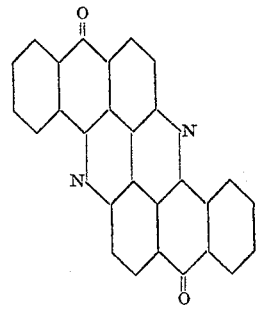

10 parts of 2-aminoanthraquinone are mixed with 102 parts of ortho dichlorobenzene and 31 parts of titanium tetrachloride. On heating to reflux the mixture becomes a dark green-black. After several hours, the excess titanium tetrachloride is distilled out and the slurry is filtered. After washing the cake with ortho dichlorobenzene and alcohol, it is steamed to remove last traces of solvent. The aqueous slurry thus obtained is vatted in the usual manner, and from the deep blue filtered vat is obtained a yellow-brown solid by aeration.

This solid is filtered off, washed and purified by treatment with sodium hypochlorite to give an orange product which dyes cotton bright yellow shades.

*Example 2*

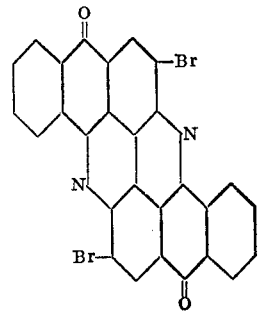

30.2 parts of 2-amino-3-bromoanthraquinone, prepared, for instance, as described in German Patent 261,271, are mixed with 326 parts of ortho dichlorobenzene and 69 parts of titanium tetrachloride. On heating at 160-170° C. for about 3 hours, the mixture gradually becomes black.

The excess titanium tetrachloride is distilled out and the slurry filtered after cooling. After washing the cake with ortho dichlorobenzene and alcohol, it is steamed to remove last traces of solvent.

The slurry is oxidized with sodium hypochlorite to a yellow-brown color. The dyestuff, thus partially purified, is vatted in the usual manner, and by aeration of the deep blue vat there is obtained a brown solid.

This is given a final sodium hypochlorite treatment and the dyestuff is filtered off and washed. It is a yellow-orange solid and dyes cotton yellow-orange.

We claim:

1. A method of producing flavanthrones which comprises condensing a beta amino anthraquinone containing the alpha position ortho to the amino group free with a condensing agent selected from the group consisting of titanium tetrachloride and titanium tetrabromide and hydrolyzing the titanium complex produced.

2. A method of producing a flavanthrone which comprises condensing beta amino anthraquinones containing the alpha position ortho to the amino group free with titanium tetrachloride and hydrolyzing the titanium complex produced.

3. A method of producing flavanthrone which comprises condensing 2-amino-anthraquinone with a condensing agent selected from the group consisting of titanium tetrachloride and titanium tetrabromide and hydrolyzing the titanium complex produced.

4. A method of producing flavanthrone which comprises condensing 2-amino-anthraquinone with titanium tetrachloride and hydrolyzing the titanium complex produced.

5. A method according to claim 1 in which the titanium complex is recovered by filtration, is vatted, the vat filtered, and the flavanthrone recovered by oxidation.

6. A method according to claim 2 in which the titanium complex is recovered by filtration, is vatted, the vat filtered, and the flavanthrone recovered by oxidation.

7. A method according to claim 3 in which the titanium complex is recovered by filtration, is vatted, the vat filtered, and the flavanthrone recovered by oxidation.

8. A method according to claim 4 in which the titanium complex is recovered by filtration, is vatted, the vat filtered, and the flavanthrone recovered by oxidation.

9. A method according to claim 1 in which the reaction takes place in the presence of an inert organic diluent.

10. A method according to claim 2 in which the reaction takes place in the presence of an inert organic diluent.

11. A method according to claim 3 in which the reaction takes place in the presence of an inert organic diluent.

12. A method according to claim 4 in which the reaction takes place in the presence of an inert organic diluent.

HANS Z. LECHER.
MARIO SCALERA.
WARREN S. FORSTER.

REFERENCES CITED

The following references are of record in the file of this patent:

UNITED STATES PATENTS

| Number | Name | Date |
|---|---|---|
| 909,800 | Isler | Jan. 12, 1909 |
| 1,478,061 | Rogers et al. | Dec. 18, 1923 |
| 1,714,249 | Smith et al. | May 21, 1929 |
| 1,904,367 | Gubelmann | Apr. 18, 1933 |

OTHER REFERENCES

Lassar-Cohn: "Arbeitsmethoden fur Organisch—Chemische Laboratorien," 4th ed. (Leipzig, 1907), p. 650.